US009753646B2

(12) United States Patent
Carpenter et al.

(10) Patent No.: US 9,753,646 B2
(45) Date of Patent: Sep. 5, 2017

(54) PROVIDING A RESERVED DATA AREA TO USE TO EXTEND A DATA SET

(71) Applicant: International Business Machines Corporation, Armonk, NY (US)

(72) Inventors: Preston A. Carpenter, Vail, AZ (US); David C. Reed, Tucson, AZ (US); Esteban Rios, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 14/604,595

(22) Filed: Jan. 23, 2015

(65) Prior Publication Data

US 2016/0216890 A1    Jul. 28, 2016

(51) Int. Cl.
*G06F 12/00* (2006.01)
*G06F 3/06* (2006.01)

(52) U.S. Cl.
CPC .......... *G06F 3/0608* (2013.01); *G06F 3/0631* (2013.01); *G06F 3/0689* (2013.01)

(58) Field of Classification Search
CPC combination set(s) only.
See application file for complete search history.

(56) References Cited

U.S. PATENT DOCUMENTS

| 7,089,392 | B2 | 8/2006 | Branch |
| 7,747,578 | B2 | 6/2010 | Gukal et al. |
| 2010/0122026 | A1* | 5/2010 | Umamageswaran . G06F 12/084 711/113 |
| 2011/0191565 | A1* | 8/2011 | LeGendre ............... G06F 12/02 711/171 |
| 2012/0023291 | A1* | 1/2012 | Zeng ................... G06F 12/0653 711/114 |
| 2013/0024640 | A1 | 1/2013 | Reed et al. |

OTHER PUBLICATIONS

IBM, "DFSMSdfp Advanced Services SC26", Third Edition, Jun. 2003, © Copyright International Business Machines Corporation 1979, 2003, Total 536 pp.
Wikipedia, "Volume of Table of Contents", (online), (Retrieved on Jan. 14, 2015). Retrieved from the Internet at <URL: http://en.wikipedia.org/wiki/Volume_table_of_contents>, last modified on Aug. 2, 2014, Total 2 pp.

* cited by examiner

*Primary Examiner* — Matthew Bradley
(74) *Attorney, Agent, or Firm* — David W. Victor; Konrad Raynes Davda & Victor LLP (57) ABSTRACT

Provided are a computer program product, system, and method for providing a reserved data area to use to extend a data set. A data set is configured in the volume configured in the storage. A reserved data area is configured in the storage for the volume. The reserved data area is used to extend the data set in the volume in response to there being insufficient available space in the data set. The reserved data area is used to allocate for use in the volume in response to there being no more available free space for use in the volume and if the reserved data area is available.

20 Claims, 6 Drawing Sheets

PROVIDING A RESERVED DATA AREA TO USE TO EXTEND A DATA SET

BACKGROUND OF THE INVENTION

1. Field of the Invention

The present invention relates to a computer program product, system, and method for providing a reserved data area to use to extend a data set.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information on data sets of extents configured in the volume, where the VTOC indicates the location of tracks, extents, and data sets for a volume in storage.

The VTOC is comprised of contiguous addresses usually starting from the first track of the volume. If the VTOC runs out of space and needs more space for records to define additional data sets configured in the volume, then the user may use a utility program to move the entire volume to a new storage area in which the VTOC is configured with additional space to accommodate the number of data sets being configured in the volume. Another technique to avoid the VTOC running out of space is to overprovision space in the VTOC beyond the expected number of data sets in case more data sets are configured than expected.

SUMMARY

Provided are a computer program product, system, and method for providing a reserved data area to use to extend a data set. A data set is configured in the volume configured in the storage. A reserved data area is configured in the storage for the volume. The reserved data area is used to extend the data set in the volume in response to there being insufficient available space in the data set. The reserved data area is used to allocate for use in the volume in response to there being no more available free space for use in the volume and if the reserved data area is available.

DETAILED DESCRIPTION

Described embodiments provide techniques for extending a data set requiring contiguous space, such as a volume table, by providing a reserved data area contiguous with respect to the space of the contiguous space data set that may be used to extend the contiguous space data set if needed. However, with descried embodiments, if there is no further free space available for other data sets, then the reserved data area may be used to create or extend data sets other than the contiguous space data set. In this way, the contiguous space data set may be readily extended by using a reserved data area of contiguous space. Moreover, if the contiguous space data set does not need to be extended, then that reserved data area may be used for other data sets if needed, such as data sets that may be non-contiguous, so the reserved data area is provisioned when first needed.

The described embodiments provide an improvement over techniques that require moving the volume to a new location because such techniques require that the volume be taken offline, which may disrupt applications using the volume. With described embodiments, the volume table or other contiguous space data set may be extended immediately from the reserved data area without disrupting access to the volume. Further, the described embodiments do not require over provisioning of space of the contiguous space data set because the reserved data area may be used to provide space to another data set if the contiguous space data set does not need to be extended.

Figure 1:
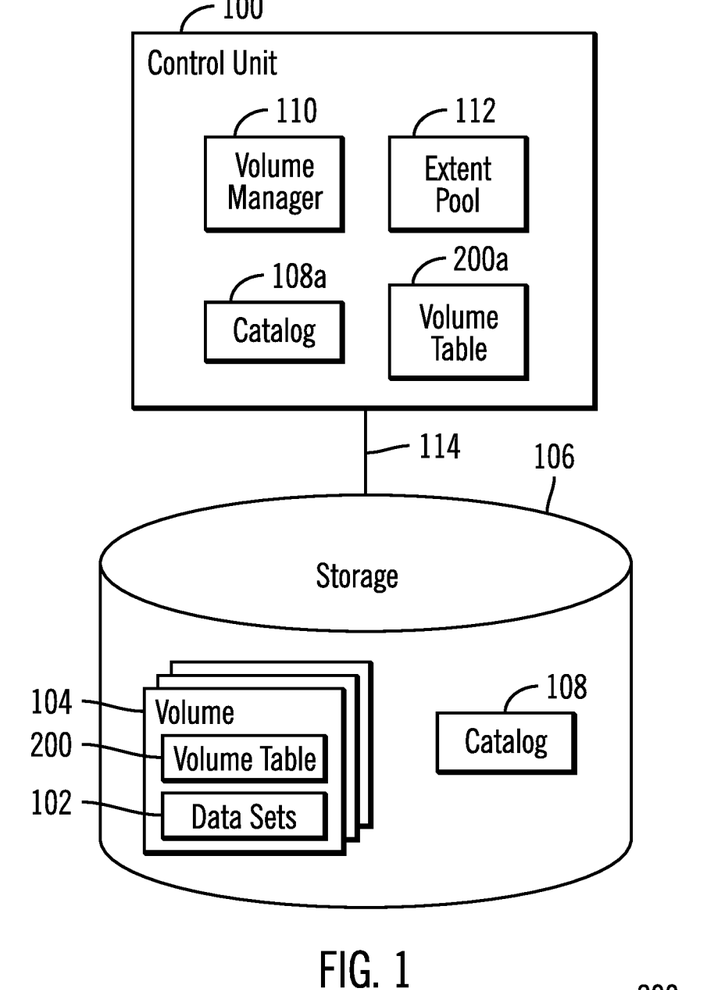
FIG. 1 illustrates an embodiment of a storage environment.

FIG. 1 illustrates an embodiment of a computing environment. Control unit 100, such as a storage controller or server, manages access to data sets 102 configured in volumes 104 in a storage 106 by hosts (not shown). A catalog 108, stored in the storage 106 and loaded into the control unit 100 as catalog 108a, provides information on the data sets 102 stored in volumes 104 configured in physical storage space in the storage 106. A data set 102 comprises a collection of data intended to be stored in a same logical allocation of data, such as data from a single application, user, enterprise, etc. A data set 102 may be comprised of separate files or records, or comprise a single file or record. Each record or file in the data set may be comprised of extents of data. The data sets 102 may comprise indexed data sets that are indexed according to a primary key that is used to locate records in the data set 102 or unindexed.

The control unit 100 includes a volume manager 110 to manage the storage of data sets 102 in the volumes 104. The volume manager 110 may be part of an operating system, such as the IBM z/OS® operating system or other operating systems. (IBM and z/OS are trademarks of IBM worldwide). An extent pool 112 is maintained of free extents in the storage 106 that can be assigned to the volumes 104 when space is needed to create new data sets or extend existing data sets 102.

Figure 2:
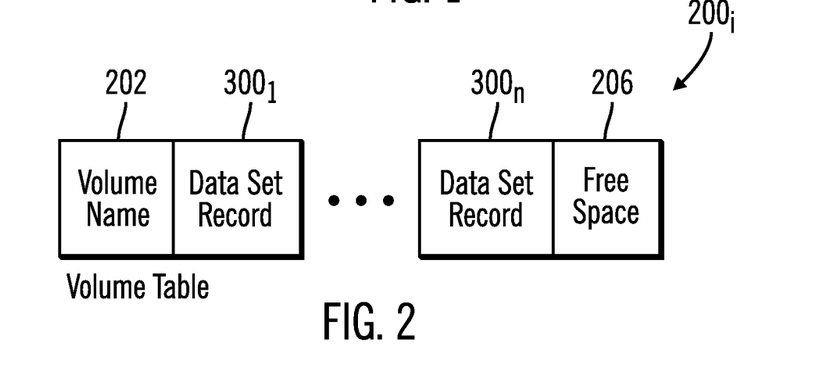
FIG. 2 illustrates an embodiment of a volume table.

Each volume 104 includes a volume table 200 having information on the volume 104 to which it pertains, including a mapping of tracks and extents of tracks to data sets 102. The volume table 200 may be stored in the volume 106, such as in the first few records of the volume, i.e., starting at the first track in the volume 104. In IBM z/OS operating system implementations, the volume table 200 may comprise a volume table of contents (VTOC). The volume tables 200 may comprise contiguous space data set having contiguous tracks or physical addresses in the storage 106. In alternative embodiments, the volume table 200 may comprise a file allocation table stored separately from the volume 104.

The control unit 100 may maintain copies of the volume tables 200a to use to manage the data sets 102 in the volumes 104. In z/OS implementations, the volume table 200, e.g., VTOC, may include information on locations of data sets in the volume 104, such as a mapping of extents in the data set to storage locations in the volume. In alternative embodiments, the volume table 200 may comprise other types of file allocation data structures that provide a mapping of data to storage locations, either logical and/or physical storage locations. In this way, the volume table 200 provides a mapping of tracks or extents to data sets 102 in the volume 104. In further embodiments, the volume table 200 may include a volume name and data set records indicating data sets having extents configured in the volume 104. Each data set record may have information for each data set 102 in a volume 104, including the one or more extents assigned to the data set 102. The extents provide a mapping or grouping of tracks in the volume 102. The catalog 108 may further include additional information on the data sets 102 allocated to the volumes 104, such as allocation sizes. The data sets 102 may be variable size data sets or fixed sized data sets.

The storage 106 may comprise one or more storage devices known in the art, such as interconnected storage devices (e.g., configured as a DASD, RAID, JBOD, virtualized devices, etc.), as a solid state storage device (SSD) comprised of solid state electronics, EEPROMs (Electrically Erasable Programmable Read-Only Memory), flash memory, flash disk, Random Access Memory (RAM) drive, storage-class memory (SCM), etc., magnetic storage disk, optical disk, tape, etc.

The control unit 100 communicates with the storage 106 via connection 114. The connection 114 may comprise one or more networks, such as a Local Area Network (LAN), Storage Area Network (SAN), Wide Area Network (WAN), peer-to-peer network, wireless network, etc. Alternatively, the connection 114 may comprise bus interfaces, such as a Peripheral Component Interconnect (PCI) bus or serial interface.

FIG. 2 illustrates an arrangement of information maintained in an instance of a volume table $200_i$ for one volume $104_i$. The volume table instance $200_i$ includes a volume name 202, also known as a volume serial number, e.g., a VOLSER, that provides a unique identifier of the volume. The volume name 202 may be included in the name of the volume table $200_i$ in the volume $104_i$. The volume table $200_i$ instance further includes one or more data set records $300_1 \ldots 300_n$ indicating data sets having extents configured in the volume $104_i$ represented by the volume table $200_i$. The volume table $200_i$ further includes one or more free space records 206 identifying ranges of available tracks in the volume $200_i$ in which additional data set records $300_{n+1}$ can be configured.

Figure 3:
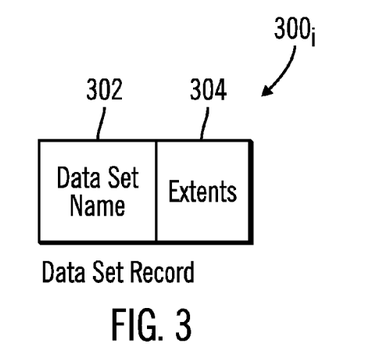
FIG. 3 illustrates an embodiment of a data set record.

FIG. 3 illustrates an embodiment of an instance of a data set record $300_i$, such as one of the data set records $300_1 \ldots 300_n$ included in the volume table $200_i$. Each data set record $300_i$ includes a data set name 302 and one or more extents 304 allocated to the data set 302. The extents 304 provide mappings of tracks in the volume 104 identified by the volume table $200_i$ in which the data set record $300_i$ is included. The tracks indicated in the map may be expressed as disk, cylinder, head and record location (CCHHR). The volume table 200 may be located at track 0 and cylinder 0 of the volume 104. Alternatively, the volume table 200 may be located at a different track and cylinder number than the first one.

Figure 4:
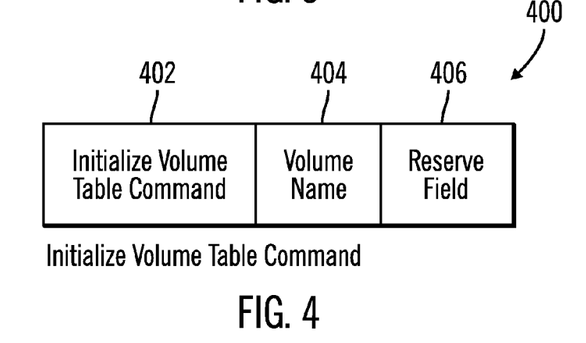
FIG. 4 illustrates an embodiment of an initialize volume table command.

FIG. 4 illustrates an embodiment of an initialize volume table command 400 used to create and initialize a volume table $200_i$ for a volume 104 being created. The initialize volume table command 400 includes a command code 402 to identify the command, a volume name 404 of the volume for which the volume table $200_i$ is created, and a reserve field 406 indicating whether to create a reserved data area for use to extend the volume table $200_i$ if the volume table being created runs of out of space to include data set records. In further embodiments, the command 400 may be to create data sets other than a volume table 200, such as other types of contiguous space data sets or other data sets.

Figure 5:
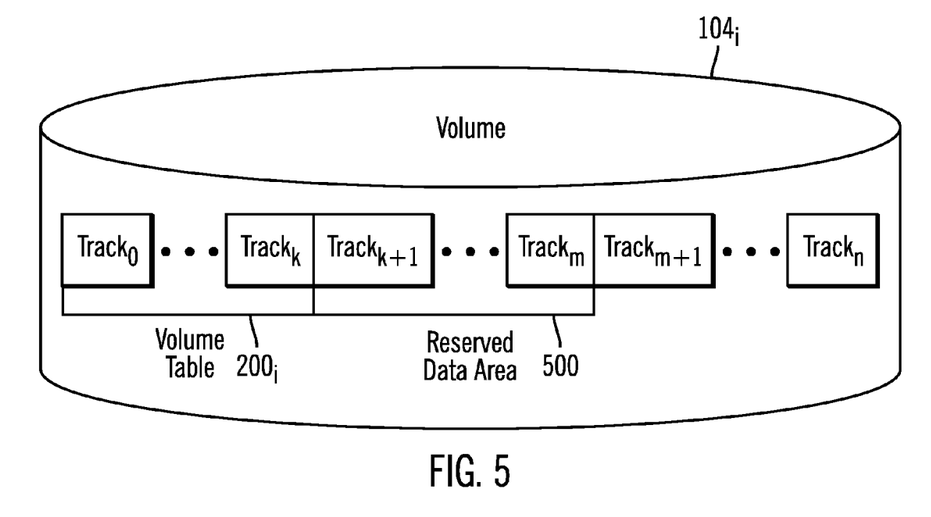
FIG. 5 illustrates an embodiment of a layout of a volume.

FIG. 5 illustrates a layout of the volume table $200_i$ and reserved data area 500 on the volume $104_i$ in the physical storage 106, where the volume table $200_i$ occupies a first series of contiguous $track_0$ to $track_k$ in physical storage 106 and the reserved data area 500 occupies physical $track_{k+1}$ to $track_m$ that are in tracks contiguous in the physical storage with respect to the tracks, $track_0$ to $track_k$ of the volume table $200_i$. $Track_{m+1}$ through $track_n$ may be allocated to other data sets in the volume $104_i$.

In certain embodiments, the data set for which the reserved data area 500 is designated may comprise a volume table. In alternative embodiments, the reserved data area 500 may be created for use with different types of data sets, such as data sets that must be configured from contiguous physical addresses or other types of data sets. In certain embodiments, the volume table may be comprised of contiguous physical addresses in the storage 106, such as tracks, blocks, etc. The reserved data area 500 may be comprised of physical addresses or tracks that are contiguous with respect to the physical addresses or tracks of the contiguous space data set, such as the track or physical address immediately following the last physical address of the volume table.

Figure 6:
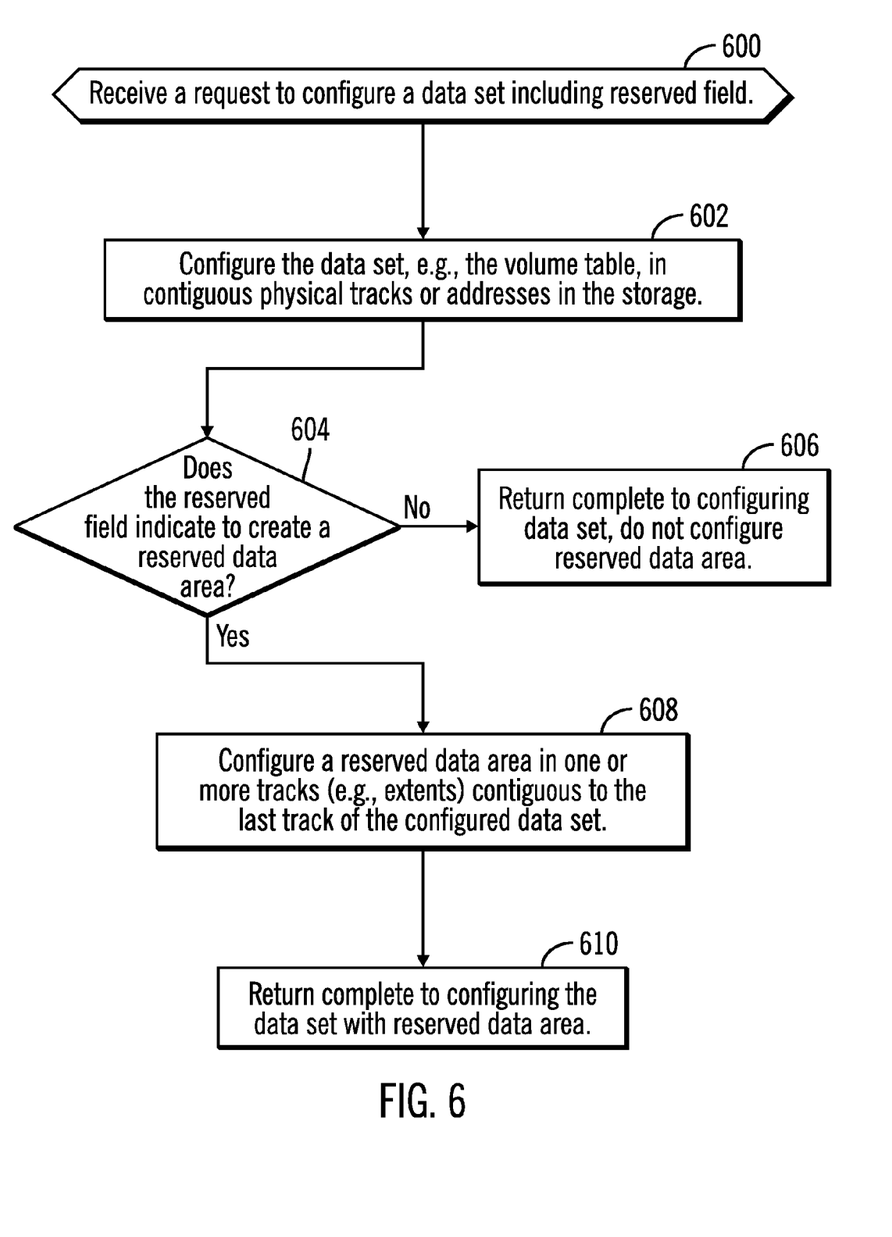
FIG. 6 illustrates an embodiment of operations to process a request to configure a data set including a reserved field.

FIG. 6 illustrates an embodiment of operations performed by the volume manager 110 or other operating system component in the control unit 100 to process a request to configure a data set including a reserved field. In one embodiment, the request may be to configure a data set occupying contiguous physical addresses, such as a volume table 200, such as the initialize volume table command 400. Upon receiving (at block 600) the request, the volume manager 12 configures (at block 602) the data set (e.g., volume table $200_i$) in contiguous physical tracks or addresses in the storage 106. If (at block 604) the reserved field 406 of the request 400 indicates to not create a reserved data area 500, then the volume manager 110 returns (at block 606) complete to configuring the data set, and does not configure a reserved data area 500 to use later use to extend the data set.

If (at block 604) the reserved field 406 indicates to configure a reserved data area 500, then the volume manager 110 configures (at block 608) a reserved data area 500 in one or more tracks contiguous to the last track of the configured data set. The reserved data area 500 may comprise one or more extents of tracks. Complete is then returned (at block 610) to the request to configure the data set (e.g., volume table $200_i$) with the reserved data area 500.

Figure 7:
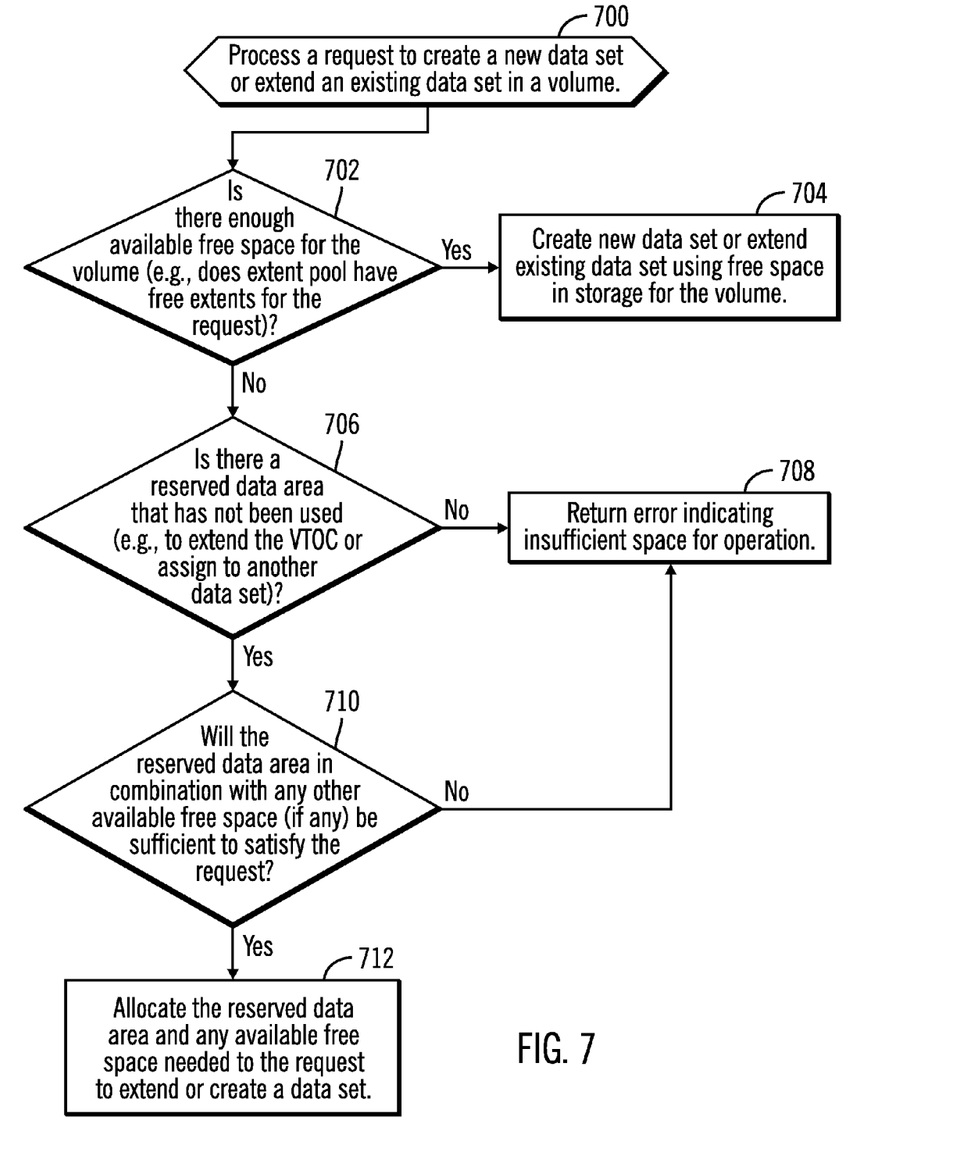
FIG. 7 illustrates an embodiment of operations to create a new data set or extend a data set.

FIG. 7 illustrates an embodiment of operations performed by the volume manager 110 or other component in the operating system to process a request to create a new data set 102 or extend an existing data set in a volume $104_i$. Upon processing the request to create or extend a data set 102, the volume manager 110 determines (at block 702) whether there is enough available space, such as available extents in the extent pool 112. If so, then the volume manager 110 creates or extends (at block 704) a data set 102 using free space or extents in extent pool 112 for the volume $104_i$. If (at block 702) there is not enough available free space, such as free extents in the extent pool 112, then the volume manager 110 determines (at block 706) whether there is a reserved data area 500 that has not been used to extend the volume table $200_i$ or previously extend or create a data set.

If (at block 706) there is no available reserved data area 500, then an error is returned (at block 708) indicating that there is not sufficient space for the data set request. If (at block 706) there is an available reserved data area 500 that was configured and has not been used, then the volume manager 110 determines (at block 710) whether the reserved data area 500 in combination with any other available free space, such as indicated in the extent pool 112, is sufficient to satisfy the request. If (at block 710) not, then control proceeds to block 708 to return the error. Otherwise if (at block 710) the reserved data area 500 in combination with what is available in the extent pool 112 provides sufficient data, then the volume manager 110 allocates (at block 712) the reserved data area 500 and any available free space form the extent pool 112 to the request to extend or create a data set 102.

With the embodiment of FIG. 7, the volume manager 110 may use the reserved data area 500 if free space is need to satisfy a data set related request not for the volume table 200 when the reserved data area 500 has not yet been needed to extend the volume table 200. However, the reserved data area 500 would no longer be available to extend the volume 104 if it is used for a data set 102. In this way, the reserved data area 500 is made available to the data set that space.

Figure 8:
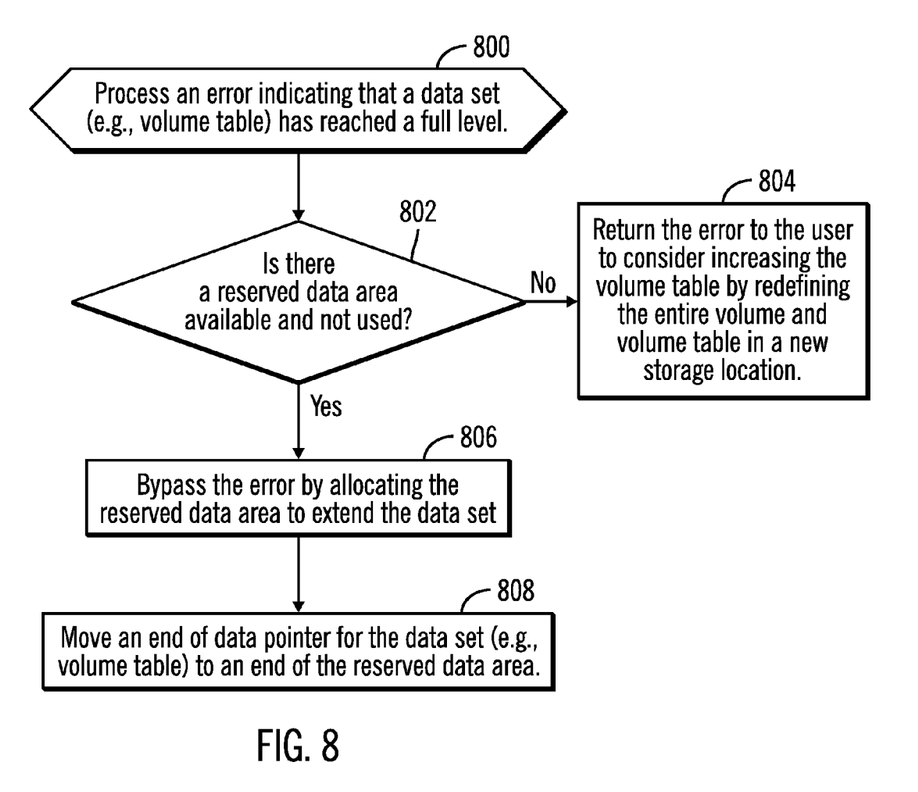
FIG. 8 illustrates an embodiment of operations to process an error indicating that a data set is full.

FIG. 8 illustrates an embodiment of operations performed by the volume manager 110 or other component in the operating system to process an error indicating that the contiguous space data set for which the reserved data area 500 is primarily intended, such as the volume table $200_i$, has reached a full level. The full level may be reached when there is still some remaining space in the data set 102 or when there is no remaining space. Upon processing the error (at block 800), the volume manager 110 determines (at block 802) whether there is a reserved data area 500 that is available and has not been used to previously extend the volume table $104_i$ or another data set. If (at block 802) there is no available reserved data area 500, then the volume manager 110 returns (at block 804) an error to the user. At this point, the user may have to use another technique to expand the volume table $200_i$, such as copy the volume table $200_i$ and all its data sets 102 to a new volume with a volume table 200 defined to have a larger contiguous data space.

If (at block 802) the reserved data area 500 is available, then the volume manager 110 may bypass (at block 806) the error by allocating the reserved data area 500 to the data set, such as volume table $200_i$ to extend the volume table $200_j$. The volume manager 110 may move (at block 808) an end of data pointer for the volume table to an end of the reserved data area 500.

For embodiments where the data set to be extended requires contiguous address spaces, such as with a volume table, the reserved data area which may be contiguous with respect to the data set, may be used at some point to extend such data set when needed. Alternatively, the reserved data area 500 may be used for another data set not requiring contiguous addresses if the data set for which it was set aside, such as the volume table, has not needed to be extended.

The reference characters used herein, such as i, k, m, and n used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
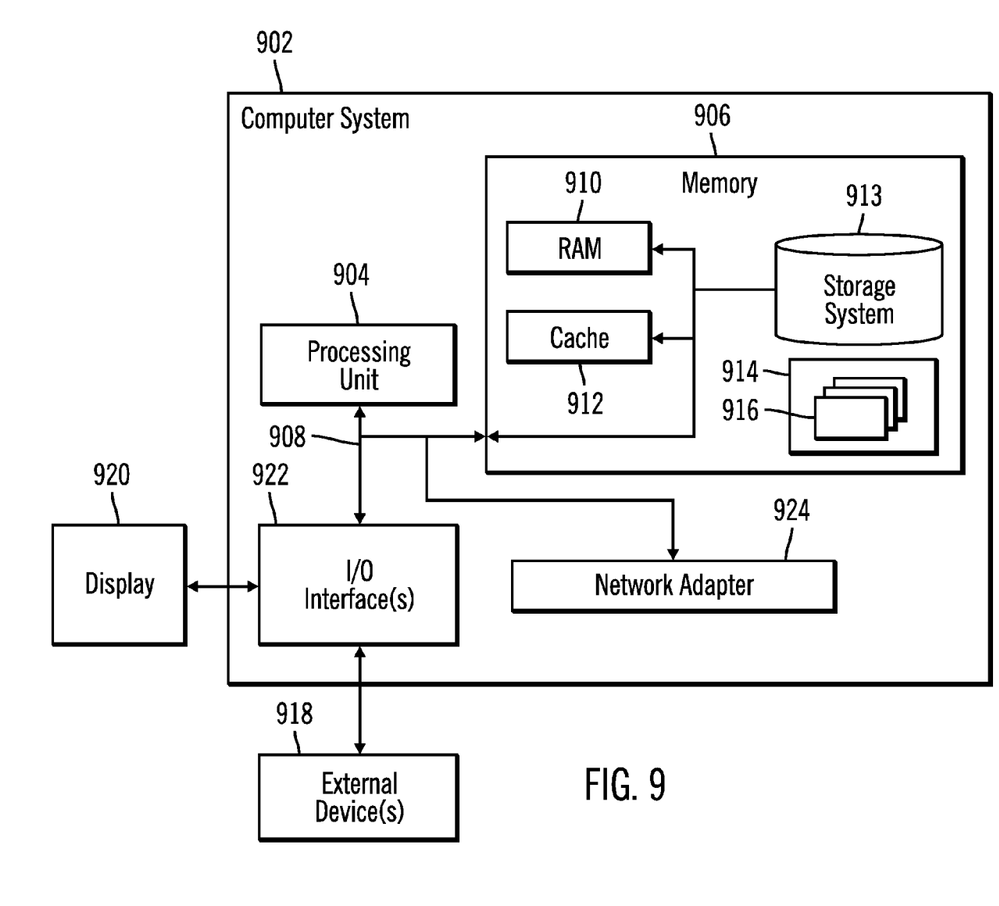
FIG. 9 illustrates a computing environment in which the components of FIG. 1 may be implemented.

The computational components of FIG. 1, including the control unit 100, may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing space assigned to data sets configured in a volume in a storage, wherein the computer program product comprises a computer readable storage medium having program instructions embodied therewith, the program instructions executable by a processor to cause operations, the operations comprising:
configuring a data set in the volume configured in the storage;
configuring a reserved data area in the storage for the volume, wherein the reserved data area includes physical space in the storage contiguous with respect to the physical space of the data set, wherein one physical address of the data set is contiguous with respect to one physical address of the reserved data area;
using the reserved data area to extend the data set in the volume in response to there being insufficient available space in the data set; and
using the reserved data area to allocate for use in the volume in response to there being no more available free space for use in the volume and if the reserved data area is available.

2. The computer program product of claim 1, wherein the data set is assigned contiguous physical space in the storage.

3. The computer program product of claim 1, wherein the data set comprises a volume table providing information on an assignment of data sets in the volume, and wherein the using the reserved data area to allocate for use in the volume comprises allocating the reserved data area to a new data set or existing data set defined in the volume table.

4. The computer program product of claim 1, wherein the data set comprises a first data set, wherein the operations further comprise:
providing an extent pool of free extents to assign to additional data sets other than the first data set configured in the volume; and
determining that the extent pool does not include any free extents to assign for a request to create a new data set or extend an additional data set in the volume, wherein the reserved data area is used to assign for the request in response to determining that the extent pool does not include any free extents and the reserved data area has not already been allocated.

5. The computer program product of claim 4, wherein the first data set comprises an initial data set configured in the volume.

6. The computer program product of claim 1, wherein the operations further comprise:
receiving a request to configure the data set for the volume including a reserved field indicating whether to configure the reserved data area, wherein the data set is configured in response to the request; and
determining whether the reserved field indicates to configure the reserved data area, wherein the operations of configuring the reserved data area, using the reserved data area to extend the data set, and using the reserved data area to allocate for use in the volume are performed in response to the determining that the reserved field indicates to configure the reserved data area.

7. The computer program product of claim 1, wherein the operations further comprise:
processing an error generated in response to the data set reaching a full level;
determining whether the reserved data area was configured for use in the volume in response to the processing the error; and bypassing the error by allocating the reserved data area to extend the data set in response to determining that the reserve data area was configured.

8. The computer program product of claim 7, wherein the data set comprises a volume table, wherein the reserved data area comprises a reserved extent physically contiguous in the storage to the volume table, wherein the operations further comprise:
moving an end of data pointer for the volume table to an end of the reserved extent in response to the allocating of the reserved extent to extend the volume table.

9. A system for managing space assigned to data sets configured in a volume in a storage, comprising:
a processor; and
a computer readable storage medium having program code executed by the processor to perform operations, the operations comprising:
configuring a data set in the volume configured in the storage;
configuring a reserved data area in the storage for the volume, wherein the reserved data area includes physical space in the storage contiguous with respect to the physical space in the data set, wherein one physical address of the data set is contiguous with respect to one physical address of the reserved data area;
using the reserved data area to extend the data set in the volume in response to there being insufficient available space in the data set; and
using the reserved data area to allocate for use in the volume in response to there being no more available free space for use in the volume and if the reserved data area is available.

10. The system of claim 9, wherein the data set is assigned contiguous physical space in the storage.

11. The system of claim 9, wherein the data set comprises a volume table providing information on an assignment of data sets in the volume, and wherein the using the reserved data area to allocate for use in the volume comprises allocating the reserved data area to a new data set or existing data set defined in the volume table.

12. The system of claim 9, wherein the operations further comprise:
receiving a request to configure the data set for the volume including a reserved field indicating whether to configure the reserved data area, wherein the data set is configured in response to the request; and
determining whether the reserved field indicates to configure the reserved data area, wherein the operations of configuring the reserved data area, using the reserved data area to extend the data set, and using the reserved data area to allocate for use in the volume are performed in response to the determining that the reserved field indicates to configure the reserved data area.

13. The system of claim 9, wherein the operations further comprise:
processing an error generated in response to the data set reaching a full level;
determining whether the reserved data area was configured for use in the volume in response to the processing the error; and
bypassing the error by allocating the reserved data area to extend the data set in response to determining that the reserve data area was configured.

14. The system of claim 13, wherein the data set comprises a volume table, wherein the reserved data area comprises a reserved extent physically contiguous in the storage to the volume table, wherein the operations further comprise:
moving an end of data pointer for the volume table to an end of the reserved extent in response to the allocating of the reserved extent to extend the volume table.

15. A method, comprising:
configuring a data set in a volume configured in a storage;
configuring a reserved data area in the storage for the volume, wherein the reserved data area includes physical space in the storage contiguous with respect to the physical space in the data set, wherein one physical address of the data set is contiguous with respect to one physical address of the reserved data area;
using the reserved data area to extend the data set in the volume in response to there being insufficient available space in the data set; and
using the reserved data area to allocate for use in the volume in response to there being no more available free space for use in the volume and if the reserved data area is available.

16. The method of claim 15, wherein the data set is assigned contiguous physical space in the storage.

17. The method of claim 15, wherein the data set comprises a volume table providing information on an assignment of data sets in the volume, and wherein the using the reserved data area to allocate for use in the volume comprises allocating the reserved data area to a new data set or existing data set defined in the volume table.

18. The method of claim 15, further comprising:
receiving a request to configure the data set for the volume including a reserved field indicating whether to configure the reserved data area, wherein the data set is configured in response to the request; and
determining whether the reserved field indicates to configure the reserved data area, wherein the configuring the reserved data area, using the reserved data area to extend the data set, and using the reserved data area to allocate for use in the volume are performed in response to the determining that the reserved field indicates to configure the reserved data area.

19. The method of claim 15, further comprising:
processing an error generated in response to the data set reaching a full level;
determining whether the reserved data area was configured for use in the volume in response to the processing the error; and
bypassing the error by allocating the reserved data area to extend the data set in response to determining that the reserve data area was configured.

20. The method of claim 19, wherein the data set comprises a volume table, wherein the reserved data area comprises a reserved extent physically contiguous in the storage to the volume table, further comprising:
moving an end of data pointer for the volume table to an end of the reserved extent in response to the allocating of the reserved extent to extend the volume table.

* * * * *